Patented July 30, 1940

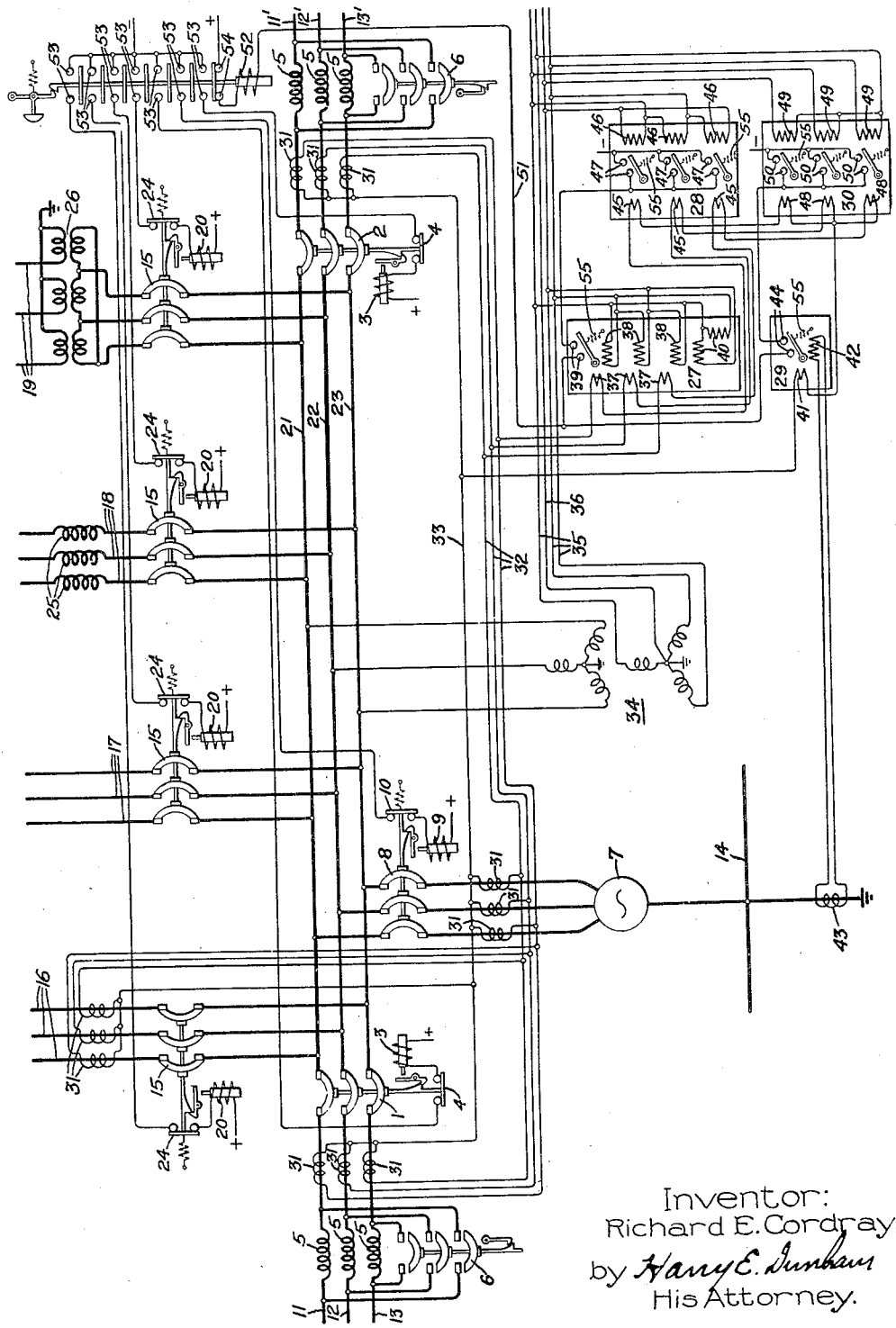

2,209,810

UNITED STATES PATENT OFFICE 2,209,810

PROTECTION OF ELECTRIC SYSTEMS

Richard E. Cordray, Upper Providence Township, Delaware County, Pa., assignor to General Electric Company, a corporation of New York Application June 13, 1939, Serial No. 278,970

13 Claims. (Cl. 175—294)

My invention relates to improvements in the protection of electric systems and more particularly to improvements in protective arrangements for busses and especially sectionalized busses of alternating current electric systems. One object of my invention is to provide an improved protective arrangement which on the occurrence of faults discriminates between bus faults and faults elsewhere on an electric system so as to isolate only a faulty bus section. Another object of my invention is to provide an improved protective arrangement which ensures the desired discrimination without the necessity for a current transformer and other auxiliaries at every point where current may flow into or from a bus section. These and other objects of my invention will appear in more detail hereinafter.

Busses are frequently protected by a differential arrangement which operates on the basis of the difference between the currents into and from a section of the bus. This arrangement requires a plurality of parallel-connected current transformers, one at every point where current is supplied to or taken from the bus. These current transformers have to be carefully coordinated as to ratio and capacity characteristics throughout their operating range in order to avoid false operation of protective relays because of an apparent fault current due to ratio departure of the current transformers. Any attempt to avoid this false operation by raising the relay settings seriously impairs the quality of the protection. The application of such differential protection is, accordingly, restricted in dependence on the number of current transformers involved. In these days of large power concentrations, especially in big cities, it is not uncommon in connection with sectionalized busses either of the star or ring type to have thirty or more feeders connected to a single bus section generally through impedance devices such as power transformers or current limiting reactors adjacent the bus. Because of the difference in capacity and ratio of the feeder and bus current transformers, it is practically impossible to coordinate very many current transformers with any reasonable degree of certainty or economy. Thus, while auto-transformers can theoretically be used to make the ratios alike, this is not satisfactory because the current transformers are then working at different points of their saturation curve. In consequence of this, even though there is a balance between the actual power currents into and from the bus, these currents, as reflected in the current transformer secondaries, produce an apparent difference which tends to and may cause incorrect relay operation. Moreover, when auto-transformers are used, it is especially severe on the current transformers with associated auto-transformers to increase their secondary current because the burden on them increases as the square of the ratio increases. Furthermore, when many current transformers are involved in differential protection, there is an increased possibility of erroneous operation when meter testing and the like is under way because the operator may ground the current transformer secondary of one circuit on the transformer side of the instrument, thereby short-circuiting the current transformer and causing an apparent difference current with a consequent false relay response.

In accordance with my invention, I avoid these difficulties of matching so many current transformer characteristics by the use of what may be termed partial differentiation, that is, differentiation based not on all of the currents into and out of the bus but only certain of such currents, for controlling a distance responsive type of relay means and a cooperating power directional type of relay means to obtain the desired discrimination which is isolation of a faulty bus.

This application is a continuation-in-part of my copending application, Serial No. 184,842, filed January 13, 1938, for Protection of electric systems, the subject matter of said prior application being incorporated in this application together with additional subject matter.

My invention will be better understood from the following description when considered in connection with the accompanying drawing, and its scope will be pointed out in the appended claims.

In the single figure of the accompanying drawing, I have illustrated diagrammatically an embodiment of my invention as applied to a three-phase alternating current sectionalized ring bus of which three sections are indicated schematically by phase conductors 11, 12 and 13; 21, 22 and 23; and 11', 12' and 13'. Only one section 21, 22 and 23 is shown completely since the others are substantial duplicates as far as my invention is concerned. The bus sections are shown as interconnected by suitable switching means such as latch-closed circuit breakers 1 and 2 which are provided with trip coils 3 and an auxiliary switch 4 which is closed when the circuit breaker is closed and opened when the circuit breaker is opened. Such auxiliary switches are commonly known as "a" switches. It is also common to provide suitable current limiting means such as bus tie reactors 5 between the bus sections. In order to reduce losses during times of light load when only one generator may be supplying the whole bus and would consequently have to feed through a plurality of reactors in series, the bus tie reactors 5 are usually arranged so that they can be shunted by suitable switching means such as short-circuiting breakers 6. Each bus section may have one or more main sources of supply indicated, for example, as a generator 7 only one of which is shown in connection with the bus section 21, 22, 23. In order to disconnect the source 7 from the bus in case of a bus fault, there is provided suitable switching means such as a circuit breaker 8 having a trip coil 9 and an "a" auxiliary switch 10. The generator 7 has its neutral connected to the station ground bus 14.

To the bus section 21, 22 and 23, there are connected through suitable switching means such as latch-closed circuit breakers 15 a plurality of feeders 16, 17, 18 and 19. The circuit breakers 15 are provided with trip coils 20 and "a" auxiliary switches 24. In order to limit the fault current which may flow in any one of such a large number of relatively low capacity feeders when they are connected to a high capacity bus, there may be inserted in the feeders adjacent the bus suitable current limiting impedance devices such as the reactors 25 shown in connection with the feeder 18. When a feeder such as 19 is connected to the bus through a transformer 26, the reactance of this may be sufficient for the purpose. There may also occur cases where feeders such as 16 and 17 are connected to the bus without any intervening current limiting means.

In order to isolate a faulty bus section, I provide means for effecting the opening of the bus tie circuit breakers 1 and 2, the source circuit breaker 8 and all the feeder circuit breakers 15 on the occurrence of a fault on the protected bus section. As shown, this means comprises for bus phase faults a directional relay 27 and a distance relay 28 and for bus ground faults a directional relay 29 and a distance relay 30. In accordance with my invention, these relays are connected to be energized by a current dependent on the vector sum of all the currents into and out of the bus section being protected except those currents in the feeders having impedance devices and in some cases in other feeders not having impedance devices as will hereinafter appear. For this purpose, I provide current transformers 31 at the ends of the bus section, in the generator circuit and preferably also in other circuits connected to the bus section without a current-limiting impedance device adjacent the bus, as, for example, the feeder 16. The secondaries of these current transformers are connected in parallel phase by phase through conductors 32 and a common return conductor 33. Further, in accordance with my invention, I arrange to have the tripping of the circuit breakers effected only when the direction of power flow is into the bus section and the ohmic or distance measurement of the distance relay is less than a predetermined value which is less than the impedance of some one of the feeder impedance devices and preferably less than the ohms impedance of that one of the feeder impedance devices having the minimum impedance.

In order to obtain these desired responses, I associate with the partial differential current obtained from the parallel-connected current transformers 31 predetermined voltages derived from the bus through a potential transformer 34 and an auxiliary potential bus comprising phase conductors 35 and a neutral conductor 36.

The phase fault directional relay 27 may be of any suitable type, examples of which are well known to the art. It may be, for example, a single unit polyphase relay or, as illustrated, a multiple element polyphase power directional type comprising current coils 37 and potential coils 38. If desired, it may further comprise the voltage restraint feature disclosed in Letters Patent 1,883,839 of the United States of America issued October 18, 1932, whereby to obtain a response independent of the amount of power except in the case of a fault. In this case, the relay contacts 39 would normally be open on power flow into the bus section. The voltage restraint feature is obtained by the cooperating potential coils 40.

The ground fault directional relay is also of a power directional type having two cooperating current coils 41 and 42, respectively energized by the zero phase sequence component of the partial differential current and by the ground fault current of the ground bus 14 through a current transformer 43. The contacts 44 of this relay will close whenever there is ground fault current flowing into the protected bus section.

For simplicity, the phase fault distance relay 28 is represented as of the impedance type, one unit for each phase. Each unit has a movable element which is controlled by the opposing effects of current and potential coils 45 and 46 energized respectively by the partial differential current of the different phases and the voltage most affected by faults involving the respective phases. Each of the phase fault distance responsive means is provided with contacts 47, and these may be connected in parallel as shown for reasons which will hereinafter appear. As illustrated, the ground fault distance relay is similar to the phase fault distance relay except that the potential coils 49 are energized by the phase to neutral voltages of the respective phases of the bus. The contacts 50 of the ground distance relay elements are also connected in parallel for the same reason as the contacts 47 of the phase distance relay elements. If more precise protection is desired, the distance relays 47 and 50 may be of the reactance responsive type examples of which are well known to the art, one such being the ohm unit of the relay disclosed in Letters Patent 1,919,969 of the United States of America issued July 25, 1933, wherein the ohmic response is based on two opposing effects, one dependent on the product of current and voltage and the other on the square of the current.

The desired cooperation between the phase fault directional and distance relays and between the ground fault directional and distance relays may be obtained, for example, by having the contacts 39 of the phase fault directional relay in series with the parallel-connected contacts 47 of the elements of the phase fault distance relay and the contacts 44 of the ground fault directional relay in series with the parallel-connected contacts 50 of the ground fault distance relay to control the energizing circuit 51 of an auxiliary multiple contact tripping relay 52. This relay, when energized, closes a plurality of contacts 53 in the respective circuits of the trip coils of the circuit breakers 1, 2, 8 and 15 whereby to effect a simultaneous tripping operation of all of these circuit breakers. As shown, the auxiliary tripping relay 52 is of the hand reset type which, upon operating to close its contacts, deenergizes its own circuit at the contacts 54. The movable contact-controlling members of the directional relays 27 and 29 and the distance relays 28 and 30 may be provided with biasing springs 55 for keeping the contacts open when the relays are deenergized.

Assuming a fault external to the bus section 21, 22, 23 on some one of the feeders 18 and 19 connected thereto, then, even though the phase fault directional relay 27 or the ground fault directional relay 29 may operate to close its contacts, depending on the kind of fault, the phase fault distance relay 28 or the ground fault distance relay 30 will not operate because the fault will be outside of the zone of ohmic response of these distance relays and consequently no tripping action will be effected. If the fault were on the feeder 16 and the feeders 18 and 19 with impedances but without current transformers do not supply current to the bus section 21, 22, 23, then the distance relays 28 and 30 cannot respond because the differential current is substantially zero. However, if any of the feeders 18 and 19, connected to this bus section and without current transformers, does supply current to the bus section 21, 22, 23, then the distance relays 28 and 30 may or may not respond depending on the relative magnitudes of the current supplied by the feeders with impedances but without current transformers and the total current into the fault. Under these conditions, the tendency is for the fault to appear much farther away than it actually is. However, in all the cases of feeder faults where current is supplied by the feeders with impedances but without current transformers, the direction of the differential current relatively to the bus voltage is such as to prevent the directional relays 27 and 29 from closing their contacts. Thus, whether or not the distance relays respond, no false tripping will occur. Assuming a fault on a bus section connected to the bus 21, 22, 23, then, depending upon the kind of fault, one or more of the elements of the phase fault distance relay 28 or the ground fault distance relay 30 may tend to operate particularly if the bus tie reactor short-circuiting breaker 6 is closed. Conditions then are essentially the same as described above in connection with a fault on the feeder 16. Here, as in the case of a fault on this feeder, the directional relays 27, 29 will prevent false tripping. Even with the circuit breaker 6 open, the ohmic response of the distance relay, as set for the feeder impedance devices, may be such that it would respond to a fault in another bus section because of the relatively low impedance of the bus tie reactor in comparison with the impedance of the feeder impedance devices.

Thus in all cases of faults outside of the protected zone, the distance and the directional relays supplement each other to prevent false operation. For faults occurring on feeders provided with impedances, such as feeders 18 and 19, the distance relays prevent false tripping even though the directional relays have a tendency to close their contacts. For faults occurring elsewhere, as in feeder 16, another bus section, such as 11, 12, 13, 11', 12', 13' for example, or generator 7, either there will be no differential current tending to cause operation of the directional and distance relays because no current is fed by feeders not provided with current transformers, or if these feeders do supply current, the direction of the differential current relatively to the bus voltage will be such that the directional relays will not close their contacts even though the distance relays may tend to close theirs. Consequently, the auxiliary tripping relay 52 remains deenergized.

In case of a fault on the bus section 21, 22, 23, the direction of flow of phase fault power or ground fault power will be such as to cause the operation of one of the directional relays 27 or 29 depending upon the kind of fault. If there is a phase fault and the phase fault directional relay is of the voltage restrained type illustrated, then the voltage restraint is reduced to a point where the phase fault directional relay can operate. At the same time one of the elements of the phase fault distance relay 28 or the ground fault distance relay 30 will operate since the ohms to the fault are within the ohmic setting of these relays. Consequently, the circuit 51 of the auxiliary tripping relay 52 will be completed whereby to energize this relay and cause the tripping of the circuit breakers 1, 2, 8 and 15 whereby to isolate the bus section.

Where the bus section includes a feeder, such as 17, connected thereto without any current limiting device adjacent the bus and without current transformers suitable for use in the differential circuit, my invention, embodying the use of the partial differential current may still be used by setting the distance relays with a time delay sufficient to allow the protective relays associated with such feeder to clear the feeder first in case of faults thereon. Inasmuch as such feeders will in general have high speed protection the delay involved in the case of bus faults would not ordinarily be objectionable. The operation will not differ from that heretofore described except for the time delay in the response of the distance relays.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States is:

1. An alternating current electric system comprising a sectionalized bus, a plurality of feeders connected to one section of said bus, an impedance device in each of a plurality of said feeders adjacent said one section, means for supplying alternating current to a plurality of sections of said bus, and means for isolating said one section on the occurrence of a fault thereon including means for deriving a current dependent on the vector sum of all the currents into and out of said section except those currents in the feeders having the impedance devices, and cooperating directional relay means and distance relay means connected to be energized in accordance with said derived current and with predetermined voltages of said one section, said directional relay means responding on the occurrence of a fault on said one section and said distance relay means having an ohmic response less than the ohmic impedance of that one of the feeder impedance devices having the smallest impedance.

2. An alternating current electric system comprising a sectionalized bus, a plurality of feeders connected to one section of said bus, an impedance device in each of said feeders adjacent said one section, means for supplying alternating current to a plurality of sections of said bus, and means for isolating said one section on the occurrence of a fault thereon including means for deriving a current dependent on the vector sum of the current supplied to said one section and the currents in said section at the ends thereof, and cooperating directional relay means and distance relay means connected to be energized in accordance with said derived current and with predetermined voltages of said one section, said directional relay means responding on the occurrence of a fault on said one section and said distance relay having an ohmic response less than the ohmic impedance of that one of the feeder impedance devices having the smallest impedance.

3. An alternating current electric system comprising a bus having a plurality of sections, switching means for connecting the sections of said bus, a plurality of feeders, switching means for connecting each of said feeders to one section of said bus, an impedance device in each of said feeders adjacent said one section, means for supplying alternating current to the sections of said bus, switching means connecting said supplying means to said sections, means for deriving a current dependent on the vector sum of the current supplied to said one section by the supplying means connected directly thereto and the currents in said one section at the ends thereof, a directional relay and a distance relay connected to be energized in accordance with said derived current and in accordance with predetermined voltages of said one section, said directional relay responding to close its contacts in case of a fault on said one section and said distance relay having an ohmic response less than the ohmic impedance of that one of the feeder impedance devices having the smallest impedance whereby to close its contacts in case of a fault on said one section, and means controlled by said relays when the contacts thereof are simultaneously closed for effecting the opening of all the switching means associated with said one section on the occurrence of a fault thereon whereby to isolate the section.

4. An alternating current electric system comprising a sectionalized bus, a plurality of feeders connected to one section of said bus, an impedance device in each of said feeders adjacent said one section, means for supplying alternating current to a plurality of sections of said bus, and means for isolating said one section on the occurrence of a fault thereon including switching means for connecting said feeders to said one section and said one section to its local source of supply and to other sections, means for deriving a current dependent on the vector sum of all the currents into and out of said one section except those currents in the feeders, a directional relay and a distance relay connected to be energized in accordance with said derived current and with predetermined voltages of said one section, said directional relay responding to close its contacts on the occurrence of a fault on said one section and said distance relay having an ohmic response to close its contacts less than the ohmic impedance of that one of the feeder impedance devices having the smallest impedance, and a control circuit for effecting the opening of all of said switching means including the contacts of both of said relays in series.

5. An alternating current electric system comprising a bus, a plurality of feeders connected to said bus, an impedance device in each of a plurality of said feeders adjacent said bus, means for supplying alternating current to said bus at a plurality of points, and means for isolating said bus from said feeders and said supplying means on the occurrence of a fault on the bus including means for deriving a current dependent on the vector sum of all the currents into and out of said section except those currents in the feeders having the impedance devices, and cooperating directional relay means and distance relay means connected to be energized in accordance with said derived current and with predetermined voltages of said bus, said directional relay means responding on the occurrence of a fault on said bus and said distance relay means having an ohmic response less than the ohmic impedance of that one of the feeder impedance devices having the smallest impedance.

6. An alternating current electric system comprising a sectionalized bus, a plurality of feeders connected to one section of said bus, an impedance device in each of a plurality of said feeders adjacent said one section, means for supplying alternating current to a plurality of sections of said bus, and means for isolating said one section on the occurrence of a fault thereon including switching means for connecting said feeders to said one section and said one section to its local source of supply and to another section, means for deriving a current dependent on the vector sum of all the currents into and out of said one section except those currents in the feeders having the impedance device, a directional relay and a distance relay connected to be energized in accordance with said derived current and with predetermined voltages of said one section, said directional relay responding to close its contacts on the occurrence of a fault on said one section and said distance relay having an ohmic response to close its contacts less than the ohmic impedance of that one of the feeder impedance devices having the smallest impedance and a control circuit for effecting the opening of all of said switching means when the contacts of both of said relays are simultaneously closed whereby to isolate said one section.

7. An alternating current system comprising a bus, a plurality of feeders connected to said bus, an impedance device in at least one of said feeders adjacent the bus, means for supplying alternating current to said bus, and means for isolating said bus on the occurence of a fault thereon including means for deriving a partial differential current dependent on the vector sum of certain of the currents into and out of said bus, and cooperating directional relay means and distance relay means connected to be energized in accordance with said derived current and with predetermined voltages of said bus, said directional relay means responding on the occurrence of a fault on said bus and said distance relay means having an ohmic response less than the ohmic impedance of that one of the feeder impedance devices having the smallest impedance.

8. An alternating current system comprising a bus, a plurality of feeders connected to said bus, one of said feeders having an impedance device connected therein adjacent the bus and another of said feeders having no impedance device, means for deriving an alternating current dependent on the vector sum of certain currents into and out of said bus excluding the currents in each of said separately mentioned feeders, and cooperating directional relay means and time delayed responsive distance relay means connected to be energized in accordance with said derived current and with predetermined voltages of said bus, said directional relay means responding on the occurrence of a fault on said bus, and said distance relay means having an ohmic response less than the ohmic impedance of said feeder impedance device.

9. An alternating current system comprising a bus, a plurality of feeders connected to said bus, at least one of said feeders having an impedance device connected therein adjacent the bus and two of said feeders having no impedance device, means for deriving an alternating current dependent on the vector sum of certain currents into and out of said bus including the current in one of said two feeders but excluding the current of the other of said two feeders, and cooperating directional relay means and time delayed responsive distance relay means connected to be energized in accordance with said derived current and with predetermined voltages of said bus, said directional relay means responding on the occurrence of a fault on said bus and said distance relay means having an ohmic response less than the ohmic impedance of that one of the feeder impedance devices having the smallest impedance.

10. An alternating current system comprising a bus, a plurality of feeders connected to said bus, some of said feeders having an impedance device connected therein adjacent the bus and some of said feeders having no impedance device, means for deriving an alternating current dependent on the vector sum of certain currents into and out of said bus excluding the current in at least one of said separately mentioned feeders, and cooperating directional relay means and time delayed responsive distance relay means connected to be energized in accordance with said derived current and with predetermined voltages of said bus, said directional relay means responding on the occurrence of a fault on said bus, and said distance relay means having an ohmic response less than the ohmic impedance of one of the feeder impedance devices.

11. An alternating current electric system comprising a bus, a plurality of feeders connected to said bus, an impedance device in each of a plurality of said feeders adjacent said bus, means for deriving a current dependent on the vector sum of all the currents into and out of said bus except those currents in the feeders having the impedance devices, and cooperating directional relay means and time delay distance relay means connected to be energized in accordance with said derived current and with predetermined voltages of said bus, said directional relay means responding on the occurrence of a fault on said bus and said distance relay means having an ohmic response less than the ohmic impedance of one of the feeder impedance devices.

12. An alternating current electric system comprising a bus, a plurality of circuits connected to said bus, an impedance device in at least one of said circuits adjacent said bus, means for supplying alternating current to said bus, and means for isolating said bus from said circuits on the occurrence of a fault thereon including means for deriving a partial differential current dependent on the vector sum of certain of the currents into and out of said bus and cooperating directional relay means and distance relay means connected to be energized in accordance with said derived current and with predetermined voltages of said bus, said directional relay means responding on the occurrence of a fault on said bus and said distance relay having an ohmic response less than the ohmic impedance of that one of the impedance devices in any circuit not contributing to said vector sum and having the smallest impedance.

13. An alternating current system comprising a bus, a plurality of circuits connected to said bus, an impedance device in at least one of said circuits adjacent the bus, means for supplying alternating current to said bus, and means for isolating said bus on the occurrence of a fault thereon including means for deriving a partial differential current dependent on the vector sum of certain of the currents into and out of said bus, and cooperating directional relay means and time delayed distance relay means connected to be energized in accordance with said derived current and with predetermined voltages of said bus, said directional relay means responding on the occurrence of a fault on said bus and said distance relay means having an ohmic response less than the ohmic impedance of one of the circuit impedance devices not contributing to said partial differential current.

RICHARD E. CORDRAY.